United States Patent
Li et al.

(10) Patent No.: US 10,328,528 B2
(45) Date of Patent: Jun. 25, 2019

(54) PIERCING PROCESSING METHOD AND LASER PROCESSING MACHINE

(71) Applicant: AMADA HOLDINGS CO., LTD., Kanagawa (JP)

(72) Inventors: Ruotao Li, Kanagawa (JP); Hiroaki Ishiguro, Kanagawa (JP)

(73) Assignee: AMADA HOLDINGS CO., LTD., Kanagawa (JP)

(*) Notice: Subject to any disclaimer, the term of this patent is extended or adjusted under 35 U.S.C. 154(b) by 0 days.

(21) Appl. No.: 15/514,074

(22) PCT Filed: Sep. 9, 2015

(86) PCT No.: PCT/JP2015/075608
§ 371 (c)(1),
(2) Date: Mar. 24, 2017

(87) PCT Pub. No.: WO2016/056342
PCT Pub. Date: Apr. 14, 2016

(65) Prior Publication Data
US 2017/0297146 A1    Oct. 19, 2017

(30) Foreign Application Priority Data
Oct. 10, 2014   (JP) .................................. 2014-208544

(51) Int. Cl.
*B23K 26/382* (2014.01)
*B23K 26/064* (2014.01)
*B23K 26/06* (2014.01)

(52) U.S. Cl.
CPC .......... *B23K 26/382* (2015.10); *B23K 26/064* (2015.10); *B23K 26/0665* (2013.01); *B23K 26/0648* (2013.01)

(58) Field of Classification Search
CPC .. B23K 26/00; B23K 26/064; B23K 26/0665; B23K 26/382; B23K 26/0648
See application file for complete search history.

(56) References Cited

U.S. PATENT DOCUMENTS 5,267,012 A * 11/1993 Sasnett ................. G01J 1/4257
356/121
2008/0314883 A1* 12/2008 Juodkazis .............. B23K 26/02
219/121.72

(Continued)

FOREIGN PATENT DOCUMENTS

CN    1730226    2/2017
EP    0884128    12/1998

(Continued)

OTHER PUBLICATIONS

Hashemzadeh, "Investigations into fibre laser cutting", Feb. 2014, University of Nottingham, PhD thesis,pp. 1.*

(Continued)

*Primary Examiner* — Geoffrey S Evans
(74) *Attorney, Agent, or Firm* — Greenblum & Bernstein, P.L.C.

(57) ABSTRACT

A piercing processing method and a laser processing machine capable of carrying out a piercing processing on a thick plate in short time are provided. It is a processing method for carrying out a piercing processing on a metallic material by laser beams with wavelengths in 1 μm band, where the piercing processing is carried out by maintaining a range of 8≤Zr/d≤12 when a condensed beam diameter of the laser beams is set to be d and a Rayleigh length of the laser beams is set to be Zr. At that time, a focal position of the laser beams is set to be on a surface of a workpiece or an external of the workpiece. Then, a beam profile of the laser beams is such that the laser beams of a single mode are (Continued)

converted into a bowler hat shape by a beam quality tunable device.

6 Claims, 3 Drawing Sheets

(56) References Cited

U.S. PATENT DOCUMENTS

| | | | |
|---|---|---|---|
| 2012/0012758 A1* | 1/2012 | Kajikawa | B23K 26/0057 250/492.1 |
| 2012/0031883 A1* | 2/2012 | Kumamoto | B23K 26/0648 219/121.78 |
| 2013/0148925 A1* | 6/2013 | Muendel | G02B 6/32 385/27 |

FOREIGN PATENT DOCUMENTS

| | | | |
|---|---|---|---|
| EP | 1623788 | | 2/2006 |
| EP | 2730363 | | 5/2014 |
| JP | 11-254171 A | * | 9/1999 |
| JP | 2000-141070 | | 5/2000 |
| JP | 2003-220487 | | 8/2003 |
| JP | 2005-21964 | | 1/2005 |
| JP | 2011-31283 | | 2/2011 |
| JP | 2011-56529 | | 3/2011 |
| JP | 2012-24782 | | 2/2012 |
| JP | 4925616 | | 5/2012 |
| JP | 2013-75331 | | 4/2013 |
| WO | 2013/086227 | | 6/2013 |

OTHER PUBLICATIONS

Office Action issued in China Counterpart Patent Appl. No. 201580052476.2, dated Dec. 5, 2017, along with an English transalation thereof.
International Search Report, along with English-language translation thereof, in JP Appl. No. PCT/JP2015/075608 dated Nov. 17, 2015.
Written Opinion of International Search Authority, along with English-language translation thereof, in JP Appl. No. PCT/JP2015/075608 dated Nov. 17, 2015.
Notice of Reasons for Refusal, along with English-language translation thereof, in JP 2014-208544 dated Nov. 4, 2015.
Decision to Grant a Patent, along with English-language translation thereof, in JP 2014-208544 dated May 17, 2016.
Official Communication issued in European Patent Office (EPO) Patent Application No. 15848766.0, dated Jun. 15, 2018.
Online publication entitled "IPG Photonics, High Power CW Fiber Lasers," brochure pp. 1 and 2.

* cited by examiner

PIERCING PROCESSING METHOD AND LASER PROCESSING MACHINE

TECHNICAL FIELD

The present invention relates to a piercing processing method and a laser processing machine for carrying out a piercing processing, at a time of carrying out a laser cutting processing on a sheet metallic material by laser beams with wavelengths in 1 µm band of a solid state laser or a fiber laser, for example, and in further detail, to a piercing processing method and a laser processing machine capable of carrying out a piercing processing on a thick plate of a mild steel plate in short time.

BACKGROUND ART

In the case of carrying out the laser cutting processing on a plate shaped workpiece such as a mild steel plate, the piercing processing is carried out on the above noted workpiece and the laser cutting processing on the workpiece is started from this piercing processed position. The above noted piercing processing is carried out almost instantaneously (several hundreds msec) in the case where the workpiece is a thin plate, so that there are not much of problems even in the case of the laser cutting processing in which the piercing processing is repeated for a plurality of times. However, when the workpiece is a thick plate, the piercing processing will require some time. For example, when the piercing processing using a 4 kW carbon dioxide gas laser oscillator is carried out on a mild steel plate with a plate thickness of 19 mm, it is going to require about 20 seconds or so for the piercing processing time. Therefore, in the case of carrying out the laser cutting processing on the workpiece, there is a desire to shorten said piercing processing time. Note that documents that are considered as relevant to the present invention include Patent Document 1.

The piercing processing method as described in said Patent Document 1 is such that a nitrogen gas is used as an assist gas and the piercing processing is carried out at high output at an initial stage of the piercing processing, and then an oxygen gas is used as an assist gas and the piercing processing is carried out at low output. Therefore, at the initial stage of the piercing processing, an oxidization reaction is going to be suppressed as a nitrogen layer is formed at a piercing processed hole. Consequently, it is going to be such that an excessive burning can be prevented and the piercing processing can be carried out in shorter time, even in the case where the laser output is made larger.

However, in the laser processing machine mounted with a fiber laser oscillator, even when the piercing processing method as described in said Patent Document 1 is practiced, it has not been possible to shorten the piercing processing time significantly. Namely, in the laser processing machine equipped with a fiber laser oscillator, there are cases where an axicon lens is used for a condensing lenmildhe laser processing head, in order to carry out the laser cutting processing on a mild steel plate as a workpiece appropriately. As this axicon lens forms ring shaped beams from incident laser beams, there has been a possibility that the energy of the laser beams is not being able to act on the workpiece effectively at a time of the piercing processing on the workpiece.

PRIOR ART DOCUMENTS

Patent Documents

Patent Document 1: Japanese Patent No. 4,925,616

SUMMARY OF THE INVENTION

The present invention has discovered that, in a configuration in which a laser processing head is equipped with a condensing lens, at a time of carrying out a laser cutting processing on a thick plate, in order to carry out a piercing processing, the piercing processing on the thick plate can be carried out efficiently by setting a ratio Zr/d of a condensed beam diameter d and a Rayleigh length Zr of the laser beams due to the condensing lens to be in a prescribed range.

According to one aspect of the present invention, there is provided a processing method for carrying out a piercing processing on a metallic material by laser beams with wavelengths in 1 µm band, a piercing processing method comprising: oscillating the laser beams with the wavelengths in 1 µm band; converting the oscillated laser beams into a beam mode of a desired multi-mode, such that a relationship between a condensed beam diameter d and a Rayleigh length Zr of the laser beams to be irradiated onto the metallic material is maintained to be in a range of $8 \leq Zr/d \leq 12$; and carrying out the piercing processing on the metallic material, using the laser beams with the beam mode converted.

Also, in said piercing processing method, the oscillated laser beams are converted such that said relationship between the condensed beam diameter d and the Rayleigh length Zr of the laser beams to be irradiated onto the metallic material is maintained to be in a range of $9 \leq Zr/d \leq 11$.

Also, in said piercing processing method, the oscillated laser beams are converted such that said relationship between the condensed beam diameter d and the Rayleigh length Zr of the laser beams to be irradiated onto the metallic material is maintained to be $Zr/d \approx 10$.

Also, in said piercing processing method, a focal position of the laser beams with said beam mode converted is set to be on a surface of a workpiece or an external of the workpiece.

Also, in said piercing processing method, a beam profile of the laser beams with said beam mode converted is in a bowler hat shape (a top hat type) in vicinity of a position at which a workpiece of the metallic material is pierced.

Also, in said piercing processing method, a beam profile of the laser beams with said beam mode converted has diameters with high beam intensities almost constant from a workpiece upper surface to a workpiece lower surface and is in a bowler hat shape in vicinity of the workpiece lower surface.

Also, in said piercing processing method, said piercing processing is carried out from a laser processing head having an axicon lens as a condensing lens.

Also, according to another aspect of the present invention, there is provided a laser processing machine for carrying out a piercing processing on a metallic material by laser beams with wavelengths in 1 µm band, the laser processing machine comprising: a laser oscillator for oscillating the laser beams with the wavelengths in 1 µm band; a beam quality tunable device for converting the laser beams oscillated from said laser oscillator into a beam mode of a desired multi-mode; a laser processing head for carrying out the piercing processing on the metallic material, using the laser beams with the beam mode converted by said beam quality tunable device; and a control device for controlling an output of said laser oscillator and an operation of said laser processing head, while controlling said beam quality tunable device such that a relationship between a condensed beam diameter d and a Rayleigh length Zr of the laser beams to be irradiated onto the metallic material from said laser processing head is maintained to be in a range of $8 \leq Zr/d \leq 12$.

Also, in said laser processing machine, said control device controls said beam quality tunable device such that said relationship between the condensed beam diameter d and the Rayleigh length Zr of the laser beams to be irradiated onto the metallic material is maintained to be in a range of $9 \leq Zr/d \leq 11$.

Also, in said laser processing machine, said control device controls said beam quality tunable device such that said relationship between the condensed beam diameter d and the Rayleigh length Zr of the laser beams to be irradiated onto the metallic material is maintained to be $Zr/d \approx 10$.

Also, in said laser processing machine, a focal position of the laser beams with said beam mode converted is set to be on a surface of a workpiece or an external of the workpiece.

Also, in said laser processing machine, a beam profile of the laser beams with said beam mode converted is in a bowler hat shape (a top hat type) in vicinity of a position at which a workpiece of the metallic material is pierced.

Also, in said laser processing machine, a beam profile of the laser beams with said beam mode converted has diameters with high beam intensities almost constant from a workpiece upper surface to a workpiece lower surface and is in a bowler hat shape in vicinity of the workpiece lower surface.

Also, in said laser processing machine, said laser processing head has an axicon lens as a condensing lens.

According to the present invention, as it is one that carries out a piercing processing by setting a ratio of a condensed beam diameter d and a Rayleigh length Zr of the laser beams to be in an appropriate range, it is one that can carry out a piercing processing on a thick plat efficiently.

DETAILED DESCRIPTION OF THE INVENTION

Figure 1:
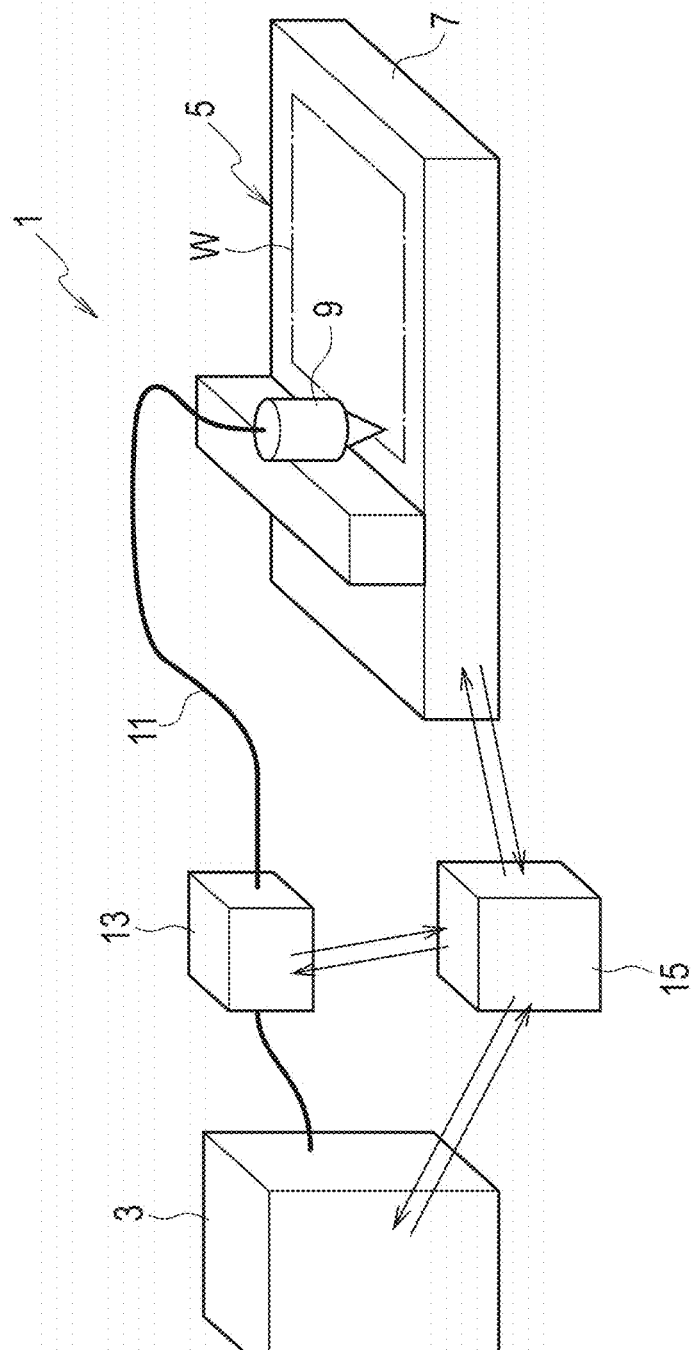
FIG. 1 is a figure for explaining a configuration that shows an overall configuration of a laser processing machine (a laser processing system) according to an embodiment of the present invention, conceptually and schematically.

As shown in FIG. 1 conceptually and schematically, a laser processing machine (a laser processing system) 1 according to an embodiment of the present invention is equipped with a laser oscillator 3 and a processing machine body 5. The above noted laser oscillator 3 is a laser oscillator such as a fiber laser oscillator and the like that oscillates laser beams with wavelengths in 1 μm band. Note that it is also possible for said laser oscillator 3 to make semiconductor laser beams with a seed light in a wavelength of less than 1 μm, as a direct diode laser. Said processing machine body 5 is equipped with a laser processing head 9, which is freely positioning relative movements in X, Y and Z axes directions with respect to a workpiece W of a thick plate shape such as a mild steel plate and the like that is mounted on a workpiece table 7, for example. This laser processing head 9 is equipped with a condensing lens (omitted to be shown in figures). Note that said laser oscillator 3 and said processing machine body 5 may very well be those having already known configurations, so that explanations about details of configurations of the laser oscillator 3 and the processing machine body 5 will be omitted.

Said laser oscillator 3 and said laser processing head 9 are optically connected via a process fiber 11. Then, a beam quality tunable device 13 is interposed in this process fiber 11. This beam quality tunable device 13 is already well-known, as described in WO2013/086227A1, Japanese patent application publication No. 2012-24782, etc., so that a detailed explanation about a configuration of the beam quality tunable device 13 will be omitted. This type of beam quality tunable device 13 is one that is capable of converting the laser beams oscillated from the laser oscillator 3, from a single mode of a Gaussian type to a multi-mode in a bowler hat shape (a top hat type).

Said laser processing machine 1 is equipped with a control device 15 such as an NC device and the like, for example. This control device 15 is configured from a computer, and has functions for controlling an output of said laser oscillator 3 and an operation of said laser processing head 9 equipped on said processing machine body 5. Moreover, said control device 15 is one that has a function for controlling said beam quality tunable device 13, so as to convert the laser beams oscillated from said laser oscillator 3 into a beam mode of a desired multi-mode.

With the above noted configuration, by controlling the output of the laser oscillator 3 while controlling the operation of the laser processing head 9 under the control of the control device 15, it is possible to carry out the laser processing with respect to the workpiece W on the workpiece table 7. At this point, by controlling the beam quality tunable device 13 under the control of the control device 15, it is possible to convert a beam profile (a beam mode) of the laser beams oscillated from said laser oscillator 3, from a single mode (a Gaussian type) to a multi-mode (a top hat type or a ring type), and transmit them to the process fiber 11. Consequently, the condensing lens equipped on the laser processing head 9 is going to condense the laser beams of a multi-mode and irradiate them onto the workpiece W.

By the way, in another configuration equipped with an axicon lens as a condensing lens in the laser processing head 9, the laser beams that have passed a focal position will be converted into a ring mode. This ring mode is suitable for the laser cutting processing on a plate shaped workpiece (a mild steel plate), but it requires some time at a time of the piercing processing to start the laser cutting processing on a thick plate, and there has been a desire to carry out the piercing processing in shorter time in the laser cutting processing in which the piercing processing is repeated.

The piercing processing in the laser processing has conventionally been such that a focal position at which the laser beams are condensed is set to be on an upper face (surface) of the workpiece or its vicinity, and the heating, the melting, and the removing are carried out all at once. In the case of carrying out the piercing processing on a thick plate using said laser processing head 9 equipped with an axicon lens as a condensing lens, as the laser beams are enlarged to a ring mode at positions lower than the focal position, the laser beams have not been acting effectively for the piercing processing, so that the piercing processing time has been long.

For this reason, the piercing processing on a thick plate was carried out by variously converting the beam mode of the laser beams by said beam quality tunable device 13 while variously changing the focal position with respect to the workpiece surface (upper face). By the way, in the case of carrying out the piercing processing on the workpiece, a hole drilling is carried out while molten metals are removed by an assist gas. Here, in the case where a condensed beam diameter d is small, it becomes difficult to eject the molten metals occurring within a hole of the piercing processing from a small upper portion hole. Also, in the case where a condensed beam diameter d is large, the energy density irradiated onto the workpiece W is lowered and a melting performance is lowered, while an amount of molten metals to be removed by the assist gas is increased. Moreover, in the case where a Rayleigh length Zr of the condensed lased beams is short, the laser beams are spread when a hole becomes deeper as the piercing processing progresses, so that the energy density is going to be lowered and the melting performance is going to be lowered.

For this reason, by converting a mode (profile) of the laser beams by using said beam quality tunable device 13, it is possible to adjust a condensed beam diameter d and a Rayleigh length Zr continuously. Consequently, when various tests were conducted to find out a good relation for a relationship between said condensed beam diameter d and said Rayleigh length Zr and the piercing processing time for a thick plate (a mild steel plate, t=19 mm, 22 mm, 25 mm), it was discovered that the piercing processing time for a thick plate becomes short when a ratio Zr/d of said condensed beam diameter d and said Rayleigh length Zr is in a prescribed range.

Figure 2:
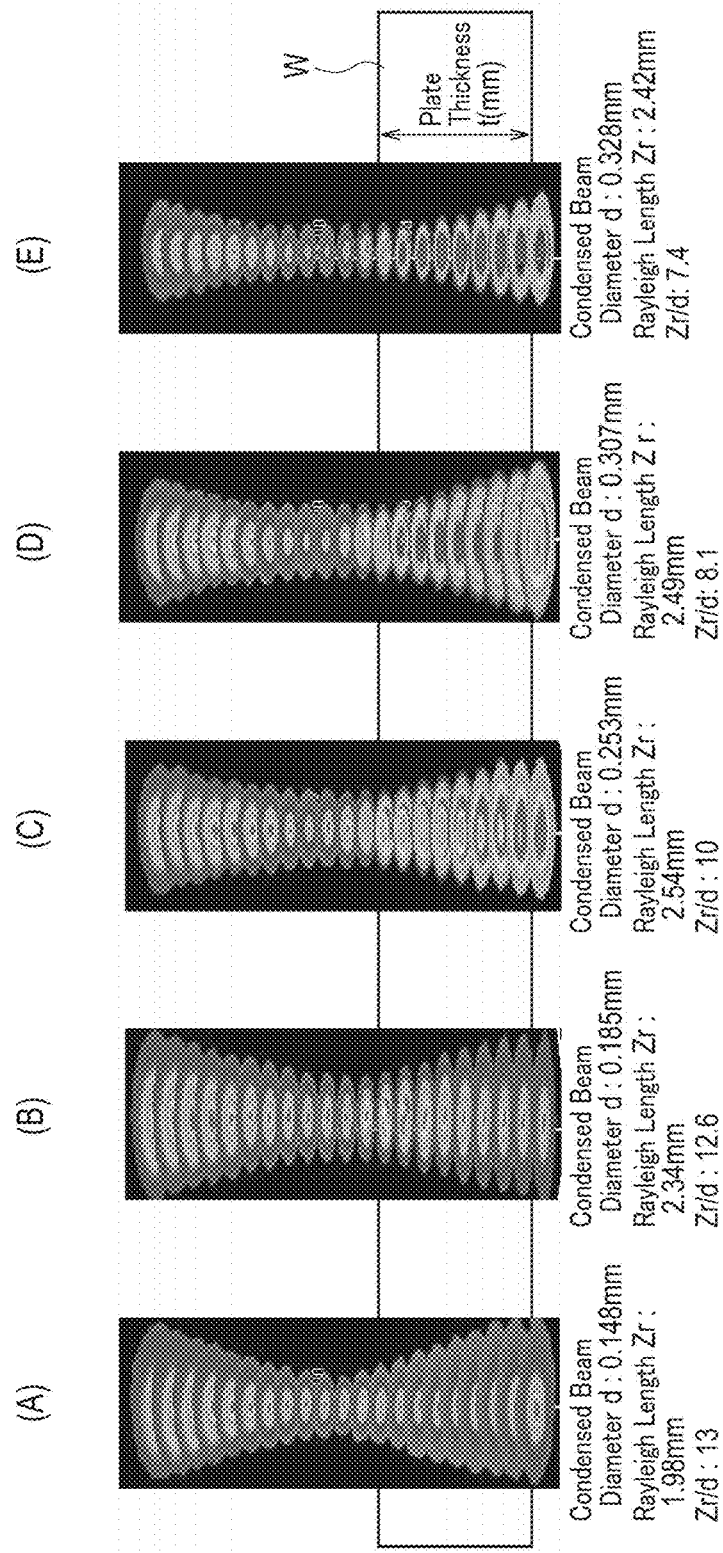
FIG. 2 is a figure for explaining that shows a beam profile in a case of carrying out a piercing processing on a thick plate.

Namely, as shown in FIG. 2, the piercing processing for a thick plate was carried out, by setting the focal position of the laser beams to be on a surface of the workpiece or an external of the workpiece, and changing the beam quality of the laser beams. Then, the condensed beam diameter d and the Rayleigh length Zr are checked in conjunction with the above noted change of the beam quality, and Rayleigh length Zr/condensed beam diameter d is checked. In the beam profile of FIG. 2(A), the condensed beam diameter d=0.148 mm and the Rayleigh length Zr=1.98 mm, so that Zr/d≈13. In the case of FIG. 2(B), d=0.185 mm and Zr=2.34 mm, so that Zr/d≈12.6, and in the case of FIG. 2(C), d=0.253 mm and Zr=2.54 mm, so that Zr/d≈10, and in the case of FIG. 2(D), d=0.307 mm and Zr=2.49 mm, so that Zr/d≈8.1. Then, in the case of FIG. 2(E), d=0.328 mm and Zr=2.42 mm, so that Zr/d≈7.4.

Figure 3:
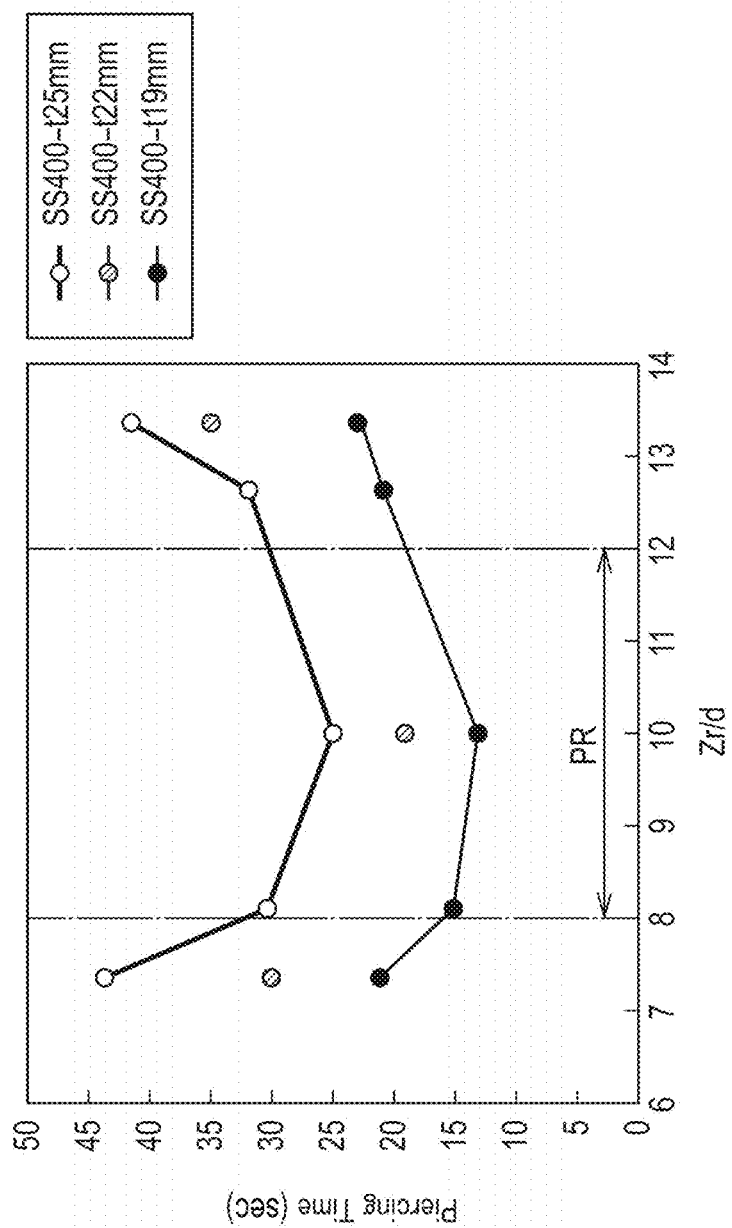
FIG. 3 is a graph of a test result that shows a relationship between a piercing processing time for a thick plate and a value of Zr/d.

Then, a relationship between the piercing time for carrying out the piercing processing for a thick plate with beam profiles shown in FIG. 2(A) to FIG. 2(E) and Zr/d was as shown in FIG. 3. As apparent from FIG. 3, for a range of Zr/d, a range of 8≤Zr/d≤12 is a preferable one (PR). Here, Zr/d≈10 is the beam profile shown in FIG. 2(C). This beam profile is the most preferable one as the piercing processing time becomes minimum. Then, this beam profile was in the so called bowler hat shape (a top hat type), in vicinity of a position at which the workpiece W is pierced. In other words, it is a beam profile for which a metal melted inside a pierced hole can be easily ejected by an assist gas pressure, as it has diameters with high beam intensities almost constant from a workpiece upper surface to a lower surface, and it exhibits a bowler hat shape (a top hat type) which is neither a Gaussian type nor a ring type at a workpiece lower surface.

Then, as apparent from FIG. 3, the next preferable range is a range of 9≤Zr/d≤11. Namely, in this range, the piercing processing time is a time within a tolerable range, although it is somewhat longer compared with the case of Zr/d≈10.

As apparent from FIG. 2 and FIG. 3, a region in which Zr/d<8 is that of FIG. 2(E), where the beam diameters become gradually larger, so that there is a tendency that a spread angle of the laser beams becomes large and the energy density in vicinity of a deep position that pierces through the thick plate becomes small. Also, FIGS. 2(B) and 2(A) have Zr/d>12, where the beam diameters are small. In this case, the spread angle of the laser beams is small and the beam diameter at a deep position for carrying out the piercing processing on the thick plate is small, so that the elimination of a metal melted at a deep position becomes difficult. Therefore, for Zr/d, a range of 8≤Zr/d≤12 is the preferable one.

The invention claimed is:

1. A processing method for carrying out a piercing processing on a metallic material by laser beams with wavelengths in 1 μm waveband, a piercing processing method comprising:
   carrying out the piercing processing by maintaining a range of 8≤Zr/d≤12, when a condensed beam diameter of the laser beams is d and a Rayleigh length of the laser beams is Zr.

2. In the piercing processing method as described in claim 1, the piercing processing method in which a ratio Zr/d of the condensed bear diameter d and the Rayleigh length Zr is in a range of 9≤Zr/d≤11.

3. In the piercing processing method as described in claim 2, the piercing processing method in which Zr/d≈10.

4. In the piercing processing method as described in claim 1, the piercing processing method in which a focal position of the laser beams is set to be on a surface of a workpiece or external to the workpiece.

5. In the piercing processing method as described in claim 1, the piercing processing method in which a beam profile of the laser beams has diameters with high beam intensities almost constant from a workpiece upper surface to a workpiece lower surface.

6. A laser processing machine for carrying out a piercing processing on a metallic material by laser beams with wavelengths in 1 μm waveband, the laser processing machine comprising:
   a fiber laser oscillator for oscillating the laser beams with the wavelengths in 1 μm waveband;
   a process fiber connected to a laser processing head for carrying out the piercing processing on the metallic material;
   a beam quality tuner configured to transmit the laser beams oscillated from said fiber laser oscillator to said process fiber; and
   a controller configured to control said beam quality tuner such that a relationship between a condensed beam diameter d and a Rayleigh length Zr of the laser beams to be irradiated onto the metallic material from said laser processing head is maintained to be in a range of 8≤Zr/d≤12, wherein
   said beam quality tuner is set such that a profile of the laser beams satisfy 8≤Zr/d≤12 during piercing.

* * * * *

UNITED STATES PATENT AND TRADEMARK OFFICE
CERTIFICATE OF CORRECTION

PATENT NO. : 10,328,528 B2
APPLICATION NO. : 15/514074
DATED : June 25, 2019
INVENTOR(S) : Li et al.

Page 1 of 1

It is certified that error appears in the above-identified patent and that said Letters Patent is hereby corrected as shown below:

In the Claims

Column 6, Line 32 (Claim 2) please change "bear diameter" to -- beam diameter --

Signed and Sealed this
Twenty-fifth Day of February, 2020

Andrei Iancu
*Director of the United States Patent and Trademark Office*